United States Patent
Davancens

(12) 
(10) Patent No.: US 6,182,334 B1
(45) Date of Patent: *Feb. 6, 2001

(54) END FASTENER FOR EYEGLASS HOLDER

(75) Inventor: Steven J. Davancens, Placerville, CA (US)

(73) Assignee: Peeper Keepers, Inc., Shingle Springs, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/852,297
(22) Filed: May 7, 1997
(51) Int. Cl.[7] .................................................. A44B 21/00
(52) U.S. Cl. ................. 24/3.3; 24/3.1; 351/156
(58) Field of Search ...................... 24/3.3, 3.13; 351/156, 351/157

(56) References Cited

U.S. PATENT DOCUMENTS

| D. 185,852 | 8/1959 | McFadyen . |
| D. 309,619 | 7/1990 | Kalbach . |
| D. 328,908 | 8/1992 | Kalbach . |
| 1,819,738 | 8/1931 | Daniels . |
| 2,249,572 | 7/1941 | Lieber . |
| 2,481,946 | 9/1949 | Pendleton . |
| 2,499,140 | 2/1950 | Griffith, Jr. . |
| 2,539,922 | 1/1951 | Nyberg . |
| 2,649,020 | 8/1953 | Wheeler . |
| 2,660,092 | 11/1953 | Bloom . |
| 2,704,961 | 3/1955 | Weil . |
| 2,780,853 | 2/1957 | Guthman . |
| 2,835,945 | 5/1958 | Hilsinger . |
| 2,858,733 | 11/1958 | Lodewick et al. . |
| 3,397,026 | 8/1968 | Spina . |
| 3,450,467 | 6/1969 | Phillips . |
| 3,502,396 | 3/1970 | Greenberg . |
| 3,539,922 | 11/1970 | Brockman . |
| 3,874,776 | 4/1975 | Seron . |
| 3,879,804 | 4/1975 | Lawrence . |
| 3,979,795 | 9/1976 | Seron . |
| 4,003,616 | * 1/1977 | Springer ............................... 339/8 R |
| 4,133,604 | 1/1979 | Fuller . |
| 4,136,934 | 1/1979 | Seron . |
| 4,541,696 | 9/1985 | Winger et al. . |
| 4,783,164 | 11/1988 | Heiberger . |
| 4,820,036 | 4/1989 | Seet . |
| 4,958,758 | * 9/1990 | Tipple et al. ......................... 224/267 |
| 4,965,913 | 10/1990 | Sugarman . |
| 4,976,531 | 12/1990 | Kahaney . |
| 5,002,381 | 3/1991 | Murrell . |

(List continued on next page.)

FOREIGN PATENT DOCUMENTS

| 058772 | 12/1981 | (EP) . |
| 2249191 | 2/1991 | (GB) . |
| 502283 | 11/1954 | (IT) . |

OTHER PUBLICATIONS

"Terra–Cord™" Tradeshow advertisement. No Date is Given.
American Bicyclist & Motorcyclist, p. 32, Mar. 1988.

Primary Examiner—Victor N. Sakran
(74) Attorney, Agent, or Firm—Millen, White, Zelano, & Branigan, P.C.

(57) ABSTRACT

An end fastener for attaching the end of an eyeglass holder cord to a temple leg of eyeglasses, said end fastener comprising a body of elastomeric material having an elongated tubular shape and a hollow core, including a base and at least one open end, and having a long axis defined through said base and said open end, said axis running through the center of said hollow core, said open end being adapted to receive a temple leg of eyeglasses, said base having means for connecting said body at said base to said end of a holder cord, said means for connecting comprising a hole extending completely through said body substantially orthogonally to said axis in the region of said base.

8 Claims, 2 Drawing Sheets

U.S. PATENT DOCUMENTS

| | | |
|---|---|---|
| 5,015,085 | 5/1991 | May . |
| 5,087,118 | 2/1992 | Gill . |
| 5,092,668 | 3/1992 | Welch et al. . |
| 5,157,425 | 10/1992 | Liu . |
| 5,182,838 | 2/1993 | Stenner . |
| 5,367,347 | 11/1994 | Wilson et al. . |
| 5,414,907 | 5/1995 | Kiapos . |
| 5,465,466 | 11/1995 | Napier . |
| 5,500,298 | 3/1996 | Badesha . |
| 5,575,042 | 11/1996 | Kalbach . |
| 5,655,263 * | 8/1997 | Stoller .................................. 351/156 |
| 5,655,264 * | 8/1997 | Davancens et al. .................... 24/3.3 |
| 5,664,291 * | 9/1997 | Stoller .................................... 24/3.3 |
| 5,940,938 * | 8/1999 | Davancens et al. .................... 24/3.3 |

* cited by examiner

END FASTENER FOR EYEGLASS HOLDER

This invention relates to an end fastener for eyeglass holders and, more particularly, to an improved end fastener for attaching the end of a holder cord to a temple leg of an eyeglass frame.

Eyeglass holders formed by a cord whose ends are attached to the temple legs of the glasses by an end fastener are known and utilized in the prior art. Conventionally, such end fasteners are affixed to the ends of a holder cord and comprise a loop or eyelet of elastic material and/or metallic spring components to resiliently grip eyeglass temple legs upon mounting thereto.

Various eyeglass holder devices are disclosed in prior art. For instance, U.S. Pat. No. 4,976,531 to Kahaney depicts an elongated tubular sleeve which is adapted to receive a temple portion of a pair of eyeglasses. A connector member, having a slot therein, can be snapped onto the rear end of the tubular sleeve. The slot receives an eyeglass retainer strap. In essence, the construction of the patent is a tube having a single hole in it. The hole receives a pin member in order to anchor the connecting piece.

A variety of patents disclose molded rubber tubes having bores open through one end for receiving the temple portion of a pair of eyeglasses and a retainer strap fused to the rear end of the tube. See U.S. Pat. No. 1,819,738 (Daniels), U.S. Pat. No. 2,539,922 (Nyberg), U.S. Pat. No. 2,704,961 (Weil) and U.S. Pat. No. 5,575,042 (Kalbach). Typically, these constructions retain the cord through techniques such as gluing, clamping, etc., for example, by means of a ferrule inside of the tube or other techniques to render the cord too large to pull back through the end opening of the tube, e.g., knotting. U.S. Pat. No. 5,092,668 to Welch shows a number of features of eyeglass cord retainer apparatus. Many of these features are present in devices available in the marketplace. The Welch '668 patent discloses a securement cord with a ring formed at each end, whereby each ring is mounted to an elastomeric loop. Each elastomeric loop includes a medial spring member encompassing each loop to effect an upper and lower loop with the upper loop of each elastomeric loop resiliently securing a temple leg of an eyeglass assembly.

Conventional eyeglass holders or retainers are known to exhibit some undesirable and disadvantageous properties. Such undesirable attributes can be related to functional deficiencies and/or to manufacturing aspects. In regard to the latter, for instance, need for special machinery and fixturing, high labor content and/or high material cost, etc. are generally representative of disadvantageous characteristics.

Some of the prior art eyeglass holders of versions that are commonly available in the market are akin to those shown and disclosed by the Welch '668 patent. Such devices have a number of disadvantages. Loops for holding temple legs tend to lose elasticity and can thusly allow detachment of the holder cord from the temple leg. Rings, springs, adjustable collars, etc. which serve for adjustment to temple-leg size and to hold tension of the loop over the temple leg have often been found inadequate to the task; and, moreover, have added material and labor cost. They also frequently capture and pull the user's hair.

Some prior art devices, particularly those having cord-end fasteners molded in one piece or fused with ends or extension components of the cord, drastically limit the choice of cord material to only those that are not adversely affected by high-temperature molding or fusing conditions. Thus, for instance, it is difficult to fuse or heat seal leather cord effectively to end fasteners of suitable moldable elastomeric materials; and, cords of Nylon and similar plastics are apt to melt at fusing temperatures. Additionally, rigid joining of end fasteners to cords (by fusing and otherwise) requires a relatively bulky joint region, which is undesirable both for reasons of the user's inconvenience and of material and cost.

A persistent problem associated with many, if not most, conventional eyeglass holders lies with the unreliable holding capability of cordend fasteners about eyeglass temple legs, particularly since temple legs of different types of glasses significantly differ in size and shape. Although various solutions have been disclosed, many have been found to be either ineffective in the long run or costly—particularly when used in combination with other features. For example, Guthman (U.S. Pat. No. 2,780,853) discloses a metal spring clasp for attaching ends of a cord to eyeglass temples. This appears to be effective, but it is also a relatively high-cost solution. One-piece, molded cord-end fasteners of elastomeric material go a long way toward low cost, but they often pose problems with unadaptability to different temple sizes and with unreliability of attachment. In this respect, Seet (U.S. Pat. No. 4,820,036) shows an end member 20 (molded in one piece with the headband) having an opening 22 through which is passed a temple leg that is to be held securely. Whereas the end member requires relatively high resiliency and elasticity to accommodate and reliably hold different-size temple legs, the headband needs substantially less resiliency and elasticity to be effective in use.

Another solution to the need for reliable holding to different-size temples is disclosed by Seron (U.S. Pat. No. 4,136,934) wherein a holding fixture 20 at the end of a band 14 includes a tail-like projection 24 with an elongated slot 26 for receipt of one of the temples. In order to provide tight gripping for differing size temples, a projection 24 is provided with a wire band 34 whose position is adjustable along projection 24 to close the slot. Again, however, adjustable collars or wire bands, etc. have often been found inadequate to the task. Moreover, they require added material and labor cost, while frequently capturing and pulling hair.

Accordingly, it is a feature of the present invention to provide a practical and functionally convenient and effective end fastener for eyeglass holders that is reliable, cost-effective, attractive, and convenient in use.

SUMMARY

In accordance with principles of the present invention, there is provided an improved end fastener for attaching the end of a holder cord to a temple leg of eyeglasses. The improved end fastener is effective, attractive, convenient to use, reliable, and relatively low in cost.

The improved end fastener of the invention includes a tubular, molded, elastomeric body for resiliently mounting the fastener about a temple leg of eyeglasses. In a first embodiment, the fastener further includes a connector-ring holder for connecting the body to an end of the cord of an eyeglass holder via a cord-end cap. In a second embodiment, the tubular elastomeric body is molded around the cord, so that the elastomeric material forms an intimate attachment with the cord, trapping the cord inside the end fastener.

In the first embodiment, the cord-end cap comprises a substantially cylindrical tube that is hollow with one end closed—the outside of the closed end being provided with an eyelet for connecting to the connector ring. The inside of the cap serves to secure an end of the cord thereto by crimping of the cap about a cord-end, by adhesive attachment of the cord-end within the cap, by fusing of the cord-end material to the inside of the cap, or by similar processes. A connector ring holder is formed by a hole through the end-fastener body. The end fastener comprises a body of elastomeric material having an elongated tubular shape and a hollow core, including a base and an open end, and having a long axis defined through said base and said open end, said axis running through the center of said hollow core, said open end being adapted to receive a temple leg of eyeglasses, said base having means for connecting said body at said base to said end of a holder cord, said means for connecting comprising a hole extending completely through said body substantially orthogonally to said axis in the region of said base.

The base can be an extension of the tubular portion, or alternatively can be a solid extension, not having a hollow core; however, the end fastener is a one-piece, molded structure. In a preferred embodiment, the base portion of the end fastener is solid, e.g., the hollow core of the tubular portions ends prior to the base. The hole in the base is adapted to retain a jump ring attached to the end of a holder cord, e.g. affixed to a cord end cap.

In the second embodiment, the end fastener is molded with the cord in place such that the elastomeric material retains the cord in place in the base. In this embodiment the base is otherwise solid except for the volume occupied by the cord, i.e., the hollow core stops prior to the portion of the elastomeric body which retains the cord. This method of retaining the cord avoids the necessity for additional means to secure the cord from pulling loose, e.g., crimping ferrules or knotting of the cord, etc.

In use of either embodiment, the tubular hollow core facilitates convenient insertion of temple legs into the end-fastener body and provides secure engagement and attachment for temple legs of differing sizes, as the elastomeric material used is deformable to an extent to accommodate large frames, yet can grip either large or small frames securely.

A preferred method for manufacturing the elastomeric end-fastener body, is to mold the body in a mold of two similar half cavities, each half cavity including a cylindrical core that extends from the wall across the half cavity. In this manner, the flat surfaces of the cores meet when the half cavities are closed upon one another along an abutment plane. The half cavities thusly form the mold cavity ready for injection of the heated and pressurized elastomeric material; the cylindrical core will produce the hole adapted for the jump ring. An additional core pin is inserted into the mold along the long axis to produce the hollow core of the molded article. Once the elastomeric material is injected and appropriately cooled and solidified, the half cavities are drawn apart substantially along the direction of the cylindrical cores so that the cores withdraw from the now-molded body, and the additional core is removed. The molded body can then be taken from the mold.

The assembly procedure of the first embodiment of the eyeglass holder according to the invention includes attaching each cord-end of the eyeglass holder cord within the hollow tube end of the cord-end cap and connecting the cord-end cap to the end fastener body by means of the (open) connector ring (jump ring) that is threaded through the end cap's eyelet and through the connector hole in the end-fastener body. The connector ring is subsequently bent to a closed shape.

Where the cord is molded directly into the end-fastener, the cores producing the hole in the base are not required. Instead, at one end of the core pin creating a round opening to accommodate the ear piece of the glasses, a small hour-glass shape is created that accommodates the cord material during the molding operation. There is a vertical standing core pin on both mold halves that penetrate the hour glass opening of the horizontal core pin clamping the cord material in place during the molding operation. This clamping action holds the cord materials central location in relationship to the mold cavities during the application of necessary molding pressures. The remainder of the cord extends out of the rubber molded piece. When the molding operation is complete, the core pin is removed leaving the cord totally encapsulated by the rubber material. This design also allows handling the cord one time rather than twice, as with conventional core pin operation. The cord is loaded into the core pin and then the core pin assembly is loaded into the mold for the molding operation, whereas conventionally the cord is loaded into a transfer block, unloaded into the mold cavity, and after removing the transfer block, each cord is pulled individually into its final molding position.

For use, the assembled eyeglass holder is attached to eyeglasses by pushing each end-fastener body (at each end of the assembly) with its tubular hollow core over one of the two temple legs of the eyeglasses into an appropriate position along the temple legs.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference numerals refer to like parts throughout different views. The drawings are schematic and not necessarily to scale, emphasis instead being placed upon illustrating principles of the invention.

DETAILED DESCRIPTION OF THE DRAWINGS

Figure 1:
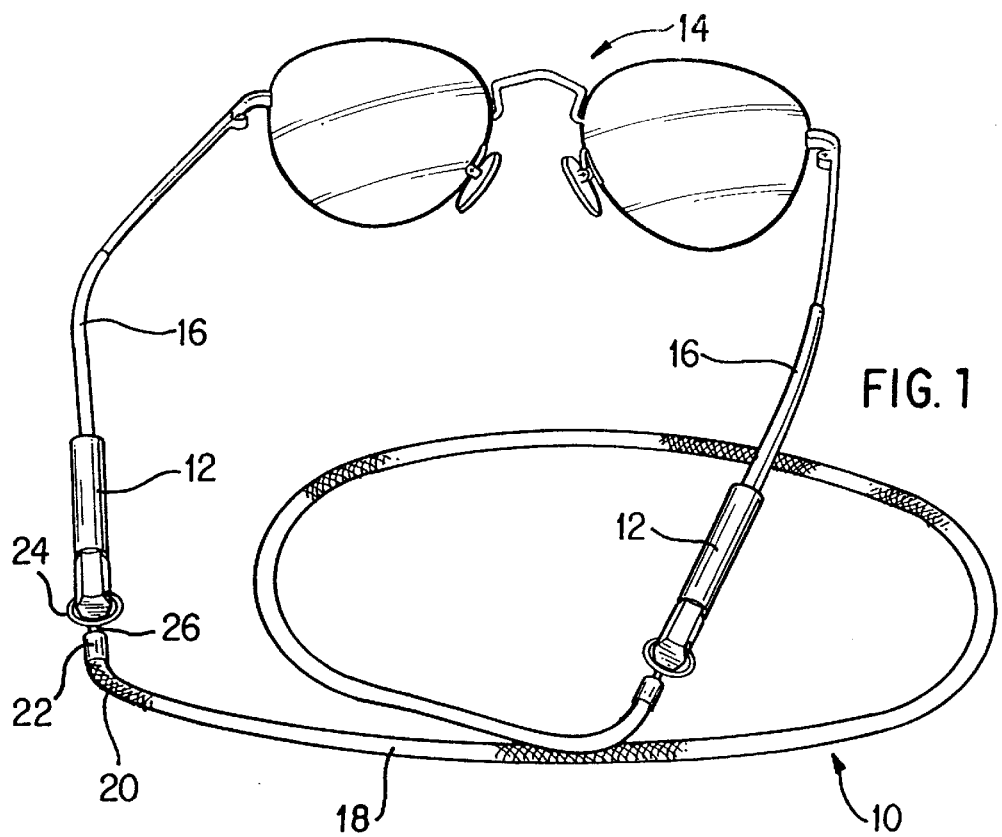
FIGS. 1 and 4 are perspective illustrations of each embodiment of the device according to principles of this invention, the device being shown assembled and attached to eyeglasses.

Referring now to FIG. 1 of the drawings, there is depicted an eyeglass holder 10 including end fasteners 12 according to the invention. Holder 10 is shown attached to temple legs 16 of eyeglasses 14. Each of the temple legs 16 is inserted through and securely mounted in one of the end fasteners 12.

Eyeglass holder 10 further comprises a holder cord 18 having ends 20, cord-end caps 22, and connecting rings 24. Ends 20 are inserted into cord-end caps 22. Each cord-end cap 22 includes an eyelet 26. A connecting ring 24 couples each end fastener 12 to an eyelet 26 of a cord-end cap 22. End fasteners 12 are thusly joined and connected to the holder cord 18. Other alternate component arrangements can be used to connect between ends 20 and connecting ring 24 while utilizing the end fastener embodiments of the present invention.

Figure 4:
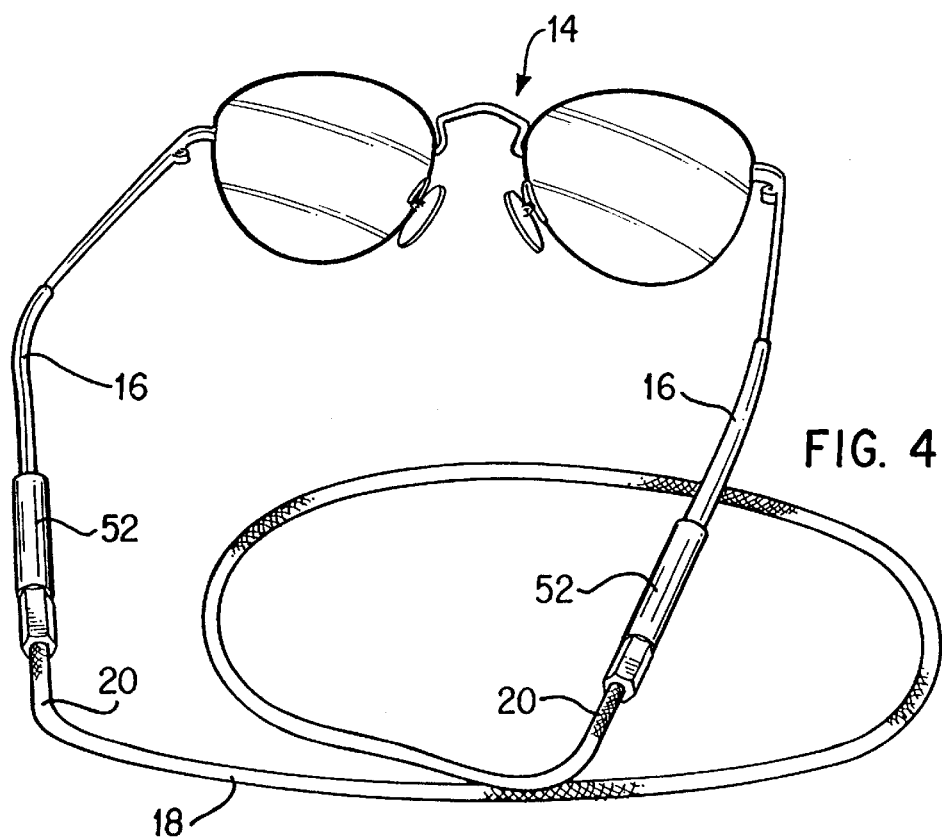
Figure 2:
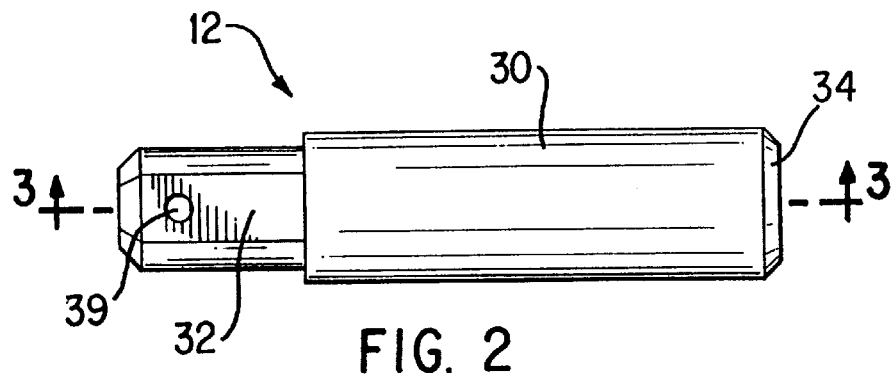
FIGS. 2, 3, 5 and 6 are side views of the device, with FIGS. 3 and 6 being cross-sectional views. The first embodiment of the invention is represented by FIGS. 1–3, the second embodiment by FIGS. 4–6.
Figure 3:
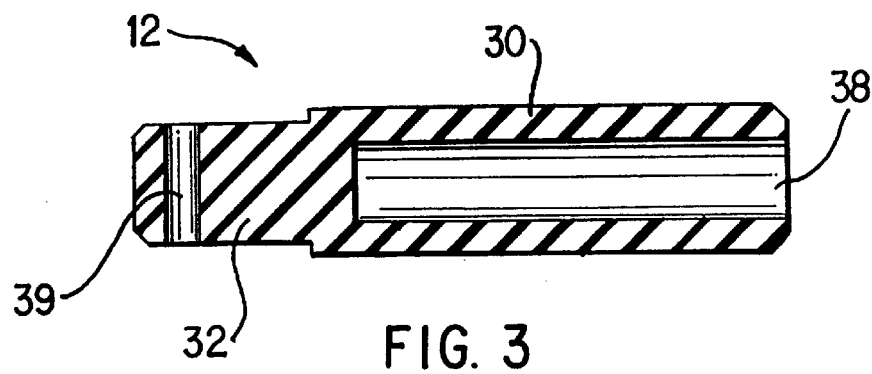

Referring now to FIGS. 2–4, there is depicted an embodiment of the end fastener 12 in various orthogonal views. End fastener 12 comprises a body 30 of an elastomeric material that includes a base 32 and a broad end 34. A long axis 3 is defined through centers of base 32 and end 34.

Figure 6:
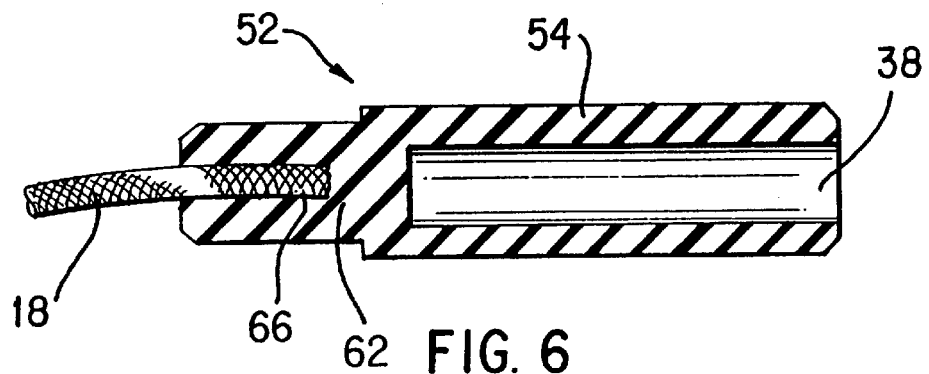

Means for securely mounting end fastener 12 resiliently over temple leg 16 is comprised in body 30 and includes a hollow core 38 that extends through body 30 along axis 3. As represented in FIGS. 3 and 6, core 38 stops short of base 32, i.e., the base 12 is solid; however, contructions where core 38 continues throughout the length of fastener 12 into the base are also within the scope of the invention. Core 38 is operational in receiving temple leg 16 and securely holding it by virtue of the elasticity and resiliency of body 30.

Means for connecting body 30 to the end of a holder cord 18 includes a hole 39 laterally through the body at narrow base 32. As indicated in conjunction with the illustration of FIG. 1, a connecting ring 24 is employed to connect end fastener 12 (body 30) to holder cord 18 via cord-end cap 22. In assembly, connecting ring 24 is threaded through hole 39 (also through eyelet 26 of end cap 22) and is thereafter bent closed in the manner of "jump rings" in jewelry manufacture.

Figure 5:
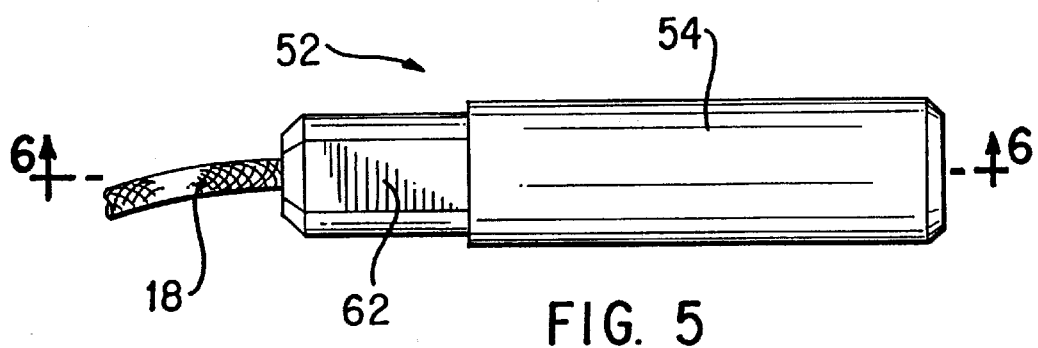

Referring now to FIGS. 5 and 6, there is depicted a sectional view of the second embodiment of the invention. Shown here is an end fastener 52 that is similar to end fastener 12 shown in the view of FIG. 2, except that the body 54 of end fastener 52 has a cavity 56 (shown in cross-sectional view in FIG. 6) which retains cord 18 due to molding of the body 54 and base 62 around the cord.

In both embodiments of the invention, molding of the end fastener is preferably effected with elastomeric material having an "A" Shore hardness in the range of 30 to 62, a specific gravity in the range of 0.89 to 1.0, and a tensile strength between 750 and 1,200 psi. Molding is preferably effected at a molding material temperature between 325 and 400 degrees F while the mold itself is heated to run in the range of 60 to 110 degrees F. Many conventional silicon elastomers are acceptable for use in the molding of the end fasteners. Alternatively, a commercially available moldable elastomer known as Krayton can be advantageously used for molding the end fastener.

While the invention has been particularly shown and described with reference to preferred embodiments thereof, it will be understood by those skilled in the art that various changes and modifications in form and details may be made therein without departing from the spirit and scope of the invention.

The entire disclosure of all applications, patents and publications, cited above and below, and of copending application Ser. No. 08/593,436, filed Jan. 29, 1996, are hereby incorporated by reference.

I claim:

1. An end fastener for attaching the end of an eyeglass holder cord to a temple leg of eyeglasses, said end fastener comprising a body of elastomeric material having an elongated tubular shape and a hollow core, including a base and at least one open end, and having a long axis defined through said base and said open end, said axis running through the center of said hollow core, said open end being adapted to receive a temple leg of eyeglasses, said base having means for connecting said body at said base to said end of a holder cord, said means for connecting comprising a hole extending completely through said body substantially orthogonally to said axis in the region of said base, and a jump ring that is threaded through said hole.

2. The end fastener of claim 1, wherein said means for connecting further comprises a jump ring that is threaded through said hole and means for coupling said jump ring to said holder cord.

3. The end fastener of claim 2, wherein said means for coupling includes a cord-end cap that fits over and about said end of a holder cord and is attachable thereto, said cord-end cap including an eyelet for engaging said jump ring.

4. The end fastener of claim 1, wherein said elastomeric body comprises a hollow tube, having two open ends.

5. The end fastener of claim 1, wherein said elastomeric body comprises a hollow tube having one open end and a solid end, which solid end is said base.

6. An end fastener for attaching the end of an eyeglass holder cord to a temple leg of eyeglasses, said end fastener comprising a body of elastomeric material having an elongated tubular shape and a hollow core, including a base and at least one open end, and having a long axis defined through said base and said open end, said axis running through the center of said hollow core, said open end being adapted to receive a temple leg of eyeglasses, said base connecting said body to said end of a holder cord, by said elastomeric material having been molded in place around said holder cord end.

7. The end fastener of claim 6, wherein the cord is secured in the body of elastomeric material by molding of the elastomeric material therearound.

8. An end fastener for attaching the end of an eyeglass holder cord to a temple leg of eyeglasses, said end fastener comprising a body of elastomeric material having an elongated tubular shape and a hollow core, including a base and at least one open end, and having a long axis defined through the center of said open end and said hollow core, said axis running through the center of said hollow core, said open end being adapted to receive a temple leg of eyeglasses, said base connecting said body to said end of a holder cord, by said elastomeric material having been molded said elastomeric material in place around said holder cord end.

* * * * *

UNITED STATES PATENT AND TRADEMARK OFFICE
CERTIFICATE OF CORRECTION

PATENT NO. : 6,182,334 B1
DATED : February 6, 2001
INVENTOR(S) : Steven J. Davancens It is certified that error appears in the above-identified patent and that said Letters Patent is hereby corrected as shown below:

Claim 8,
Lines 10-11, after "molded" delete "said elastomeric material".

Signed and Sealed this

Sixth Day of November, 2001

Attest:

NICHOLAS P. GODICI
Acting Director of the United States Patent and Trademark Office Attesting Officer